United States Patent
Randhawa et al.

(10) Patent No.: US 11,199,944 B2
(45) Date of Patent: Dec. 14, 2021

(54) SYSTEM AND METHOD FOR NAVIGATION WITHIN WIDGET-SIZED BROWSER PANELS

(71) Applicant: salesforce.com, inc., San Francisco, CA (US)

(72) Inventors: Tanveer Singh Randhawa, Vallejo, CA (US); Avaneesh Desai, San Francisco, CA (US); Kumar Kasimala, Fremont, CA (US); Davina Lim, Mill Valley, CA (US); Shradha Kohli, South San Francisco, CA (US); Bhagyashree Deokar, Mountain View, CA (US); Kathryn Basye, Alemeda, CA (US); Gautam Vasudev, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 121 days.

(21) Appl. No.: 16/140,478

(22) Filed: Sep. 24, 2018

(65) Prior Publication Data
US 2020/0097609 A1 Mar. 26, 2020

(51) Int. Cl.
*G06F 3/0482* (2013.01)
*G06F 16/954* (2019.01)
*G06F 16/16* (2019.01)
*G06F 3/0481* (2013.01)

(52) U.S. Cl.
CPC ........ *G06F 3/0482* (2013.01); *G06F 3/04817* (2013.01); *G06F 16/168* (2019.01); *G06F 16/954* (2019.01); *G06F 2203/04803* (2013.01)

(58) Field of Classification Search
CPC ..... G06F 3/0482; G06F 16/954; G06F 16/168
See application file for complete search history.

(56) References Cited

U.S. PATENT DOCUMENTS

| | | | |
|---|---|---|---|
| 5,537,380 A * | 7/1996 | Sprankle, Jr. | ......... G01S 7/6245 367/105 |
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |

(Continued)

*Primary Examiner* — Justin R. Blaufeld
(74) *Attorney, Agent, or Firm* — LKGlobal | Lorenz & Kopf, LLP

(57) ABSTRACT

A widget browser module configured to display data item descriptors is disclosed. The widget browser module is configured to: generate, responsive to a request from an executing application that is causing the display of an application window on a display device, a widget browser window for display over a portion, but not all, of the application window, the widget browser window including a two-panel display window and a status bar display window positioned underneath the two-panel display window; display a plurality of sibling data item descriptors in a first panel of the two-panel display window that are contextually relevant to content in the application window; and display, after selection of a data item descriptor, the selected data item descriptor and sibling data item descriptors in the first panel and child data item descriptors of the selected data item descriptor in a second panel of the two-panel display window.

17 Claims, 6 Drawing Sheets

(56) References Cited

U.S. PATENT DOCUMENTS

| | | | |
|---|---|---|---|
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,943,053 A * | 8/1999 | Ludolph | G06F 3/0481 |
| | | | 715/790 |
| 5,963,953 A | 10/1999 | Cram et al. | |
| 6,092,083 A | 7/2000 | Brodersen et al. | |
| 6,161,149 A | 12/2000 | Achacoso et al. | |
| 6,166,736 A * | 12/2000 | Hugh | G06F 3/0481 |
| | | | 715/777 |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,069,231 B1 | 6/2006 | Cinarkaya et al. | |
| 7,162,488 B2 * | 1/2007 | DeVorchik | G06F 16/168 |
| 7,181,758 B1 | 2/2007 | Chan | |
| 7,240,292 B2 * | 7/2007 | Hally | G06F 3/0481 |
| | | | 715/778 |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,401,094 B1 | 7/2008 | Kesler | |
| 7,412,455 B2 | 8/2008 | Dillon | |
| 7,508,789 B2 | 3/2009 | Chan | |
| 7,620,655 B2 | 11/2009 | Larsson et al. | |
| 7,694,233 B1 * | 4/2010 | Ording | G06F 3/0484 |
| | | | 715/790 |
| 7,698,160 B2 | 4/2010 | Beaven et al. | |
| 7,730,478 B2 | 6/2010 | Weissman | |
| 7,779,475 B2 | 8/2010 | Jakobson et al. | |
| 8,014,943 B2 | 9/2011 | Jakobsen | |
| 8,015,495 B2 | 9/2011 | Achacoso et al. | |
| 8,032,297 B2 | 10/2011 | Jakobsen | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,209,308 B2 | 6/2012 | Rueben et al. | |
| 8,275,836 B2 | 9/2012 | Beaven et al. | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 2001/0044791 A1 | 11/2001 | Richter et al. | |
| 2001/0049675 A1 * | 12/2001 | Mandler | G06F 16/192 |
| 2002/0072951 A1 | 6/2002 | Lee et al. | |
| 2002/0082892 A1 | 6/2002 | Raffel | |
| 2002/0097278 A1 * | 7/2002 | Mandler | G06F 3/0481 |
| | | | 715/854 |
| 2002/0129352 A1 | 9/2002 | Brodersen et al. | |
| 2002/0130904 A1 * | 9/2002 | Becker | H04L 51/04 |
| | | | 715/753 |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0230599 A1 * | 11/2004 | Moore | G06F 3/0483 |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0081164 A1 * | 4/2005 | Hama | H04M 1/72469 |
| | | | 715/830 |
| 2005/0091098 A1 | 4/2005 | Brodersen et al. | |
| 2006/0021019 A1 | 1/2006 | Hinton et al. | |
| 2006/0036568 A1 * | 2/2006 | Moore | G06F 16/168 |
| 2006/0161859 A1 * | 7/2006 | Holecek | G06F 3/048 |
| | | | 715/781 |
| 2006/0161860 A1 * | 7/2006 | Holecek | G06F 3/048 |
| | | | 715/781 |

(56) References Cited

U.S. PATENT DOCUMENTS

| | | | |
|---|---|---|---|
| 2006/0195790 A1* | 8/2006 | Beaupre | G06F 16/3344 715/727 |
| 2006/0218500 A1* | 9/2006 | Sauve | G06F 3/0483 715/767 |
| 2007/0005715 A1* | 1/2007 | LeVasseur | H04L 51/36 709/206 |
| 2007/0088687 A1* | 4/2007 | Bromm | G06F 16/3334 |
| 2008/0040675 A1* | 2/2008 | Canfield | G06F 3/0481 715/752 |
| 2008/0249972 A1 | 10/2008 | Dillon | |
| 2009/0063414 A1 | 3/2009 | White et al. | |
| 2009/0100342 A1 | 4/2009 | Jakobson | |
| 2009/0106674 A1* | 4/2009 | Bray | G06F 16/156 715/762 |
| 2009/0177744 A1 | 7/2009 | Marlow et al. | |
| 2009/0199128 A1* | 8/2009 | Matthews | G06F 3/04883 715/799 |
| 2010/0248788 A1* | 9/2010 | Yook | G06F 3/0481 455/566 |
| 2010/0287494 A1* | 11/2010 | Ording | G06T 13/80 715/790 |
| 2011/0163970 A1* | 7/2011 | Lemay | G06F 3/0483 345/173 |
| 2011/0181521 A1* | 7/2011 | Reid | G06F 3/0483 345/173 |
| 2011/0247051 A1 | 10/2011 | Bulumulla et al. | |
| 2011/0302528 A1* | 12/2011 | Starr | G06F 9/451 715/800 |
| 2012/0042218 A1 | 2/2012 | Cinarkaya et al. | |
| 2012/0054674 A1* | 3/2012 | Beykpour | G06F 3/0481 715/788 |
| 2012/0204125 A1* | 8/2012 | Shia | G06F 3/0488 715/773 |
| 2012/0218958 A1 | 8/2012 | Rangaiah | |
| 2012/0233137 A1 | 9/2012 | Jakobson et al. | |
| 2013/0086175 A1* | 4/2013 | Claux | G06F 3/0482 709/206 |
| 2013/0086507 A1* | 4/2013 | Poston | G06F 3/0483 715/777 |
| 2013/0125047 A1* | 5/2013 | Levin | G06F 3/017 715/790 |
| 2013/0205244 A1* | 8/2013 | Decker | G06F 3/04845 715/777 |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0223614 A1* | 8/2013 | Tuchman | G06F 3/0485 379/265.09 |
| 2013/0247216 A1 | 9/2013 | Cinarkaya et al. | |
| 2014/0047308 A1* | 2/2014 | Chub | G06F 40/106 715/201 |
| 2014/0047361 A1* | 2/2014 | Gaspar | G06F 3/048 715/762 |
| 2014/0075363 A1* | 3/2014 | Kritt | G06F 3/0482 715/772 |
| 2014/0213318 A1* | 7/2014 | Leem | G06F 3/0486 455/556.1 |
| 2014/0337794 A1* | 11/2014 | Vranjes | G06F 3/0481 715/800 |
| 2014/0344710 A1* | 11/2014 | Topatan | H04L 51/22 715/752 |
| 2014/0359436 A1* | 12/2014 | Kim | G06F 3/0481 715/702 |
| 2015/0067588 A1* | 3/2015 | Shim | G06F 3/0481 715/790 |
| 2015/0082251 A1* | 3/2015 | Lam | G06F 16/168 715/843 |
| 2015/0277711 A1* | 10/2015 | Masterson | G06T 13/80 715/752 |
| 2015/0277722 A1* | 10/2015 | Masterson | G06F 3/04842 715/752 |
| 2016/0103793 A1* | 4/2016 | Fang | G06F 3/0483 715/234 |
| 2016/0283085 A1* | 9/2016 | Beausoleil | G06F 16/9535 |
| 2016/0357357 A1* | 12/2016 | Lemay | G06F 3/0481 |
| 2017/0031555 A1* | 2/2017 | Ma | G06F 3/0488 |
| 2018/0189073 A1* | 7/2018 | Larabie-Belanger | G06F 9/542 |
| 2018/0189692 A1* | 7/2018 | Newhouse | G06F 16/25 |
| 2018/0189736 A1* | 7/2018 | Guo | G06Q 10/06 |
| 2019/0050190 A1* | 2/2019 | Murphy | G06F 8/38 |
| 2019/0124169 A1* | 4/2019 | Sundin | G06Q 10/101 |

\* cited by examiner

FIG. 4

SYSTEM AND METHOD FOR NAVIGATION WITHIN WIDGET-SIZED BROWSER PANELS

TECHNICAL FIELD

Embodiments of the subject matter described herein relate generally to widgets, and more particularly to widget-sized panels used for navigating through a hierarchical structure.

BACKGROUND

Widgets may be embedded in an application display window to allow macros to be invoked to perform various functions. This can allow a user to function more efficiently and productively.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 4 is a diagram depicting another example screenshot of a display device that illustrates features provided by an example widget browser module, in accordance with some embodiments.

DETAILED DESCRIPTION

The following disclosure provides many different embodiments, or examples, for implementing different features of the provided subject matter. The following detailed description is merely exemplary in nature and is not intended to limit the invention or the application and uses of the invention. Furthermore, there is no intention to be bound by any theory presented in the preceding background or the following detailed description.

As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

The subject matter described herein discloses apparatus, systems, techniques and articles for an intuitive and efficient way for allowing a user to navigate through folders within a small or widget sized (e.g., 600×480) browser panel (e.g., Macro and QuickText panel). In one example, a widget browser module is configured to cause the display of a browser panel that is divided into two sub-panels (referred to herein as a first (e.g., left) panel and a second (e.g., right) panel. When the browser panel loads, it displays a list of Macros and Folders in the left panel. Selecting (e.g., clicking on) a folder in the left panel will cause a content listing of that folder to display inside the right panel. Selecting (e.g., clicking on) a folder in the right panel will cause the list in the right panel to shift to the left panel, cause a content listing of the selected folder to display in the right panel, and cause the update of a breadcrumb navigational tool containing breadcrumbs (e.g., clickable items) located in a footer panel that indicate the path that has been traversed to that point. Selecting (e.g., clicking on) a previous folder in the breadcrumb navigational tool will cause the selected folder and a list of sibling folders to be displayed in the left panel and cause a content listing of the selected folder to be displayed in the right panel. Additionally, a user can navigate back and forth through the folder structure displayed in the browser panel by pressing the forward or back arrow keys on a keyboard.

Figure 1:
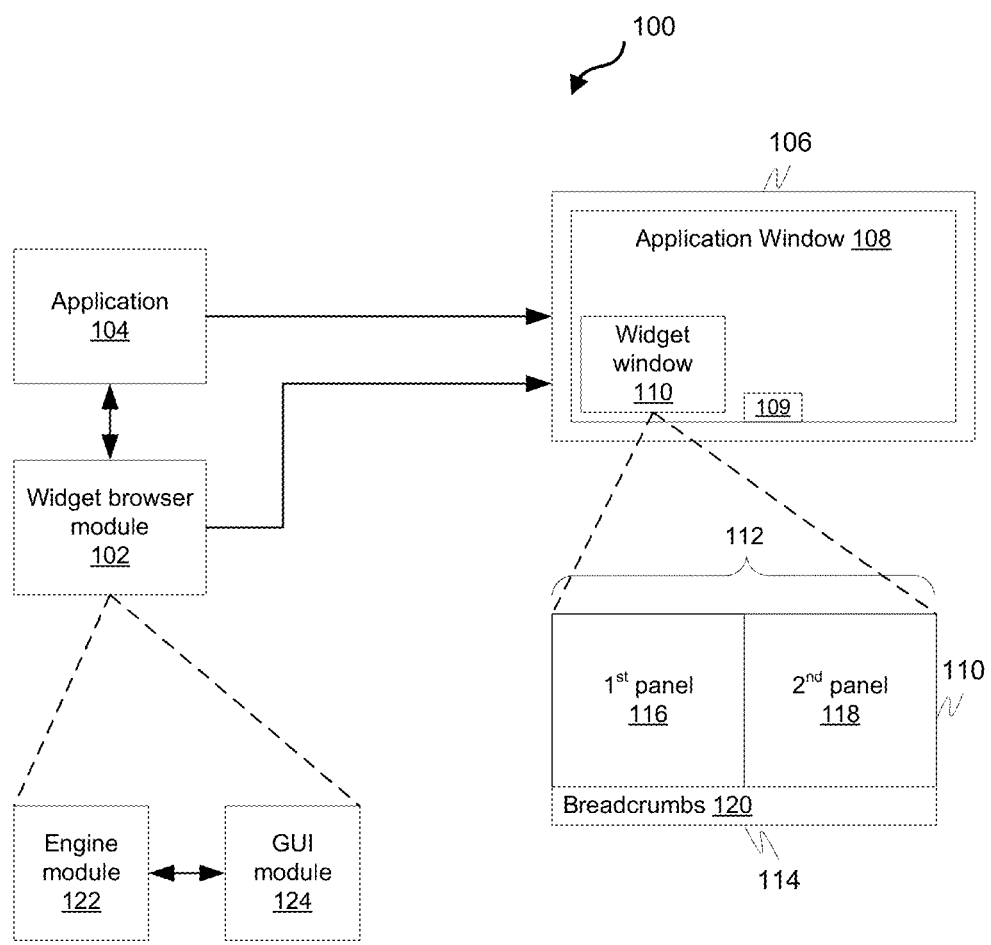
FIG. 1 is a block diagram depicting an example computing environment that includes a widget browser module, in accordance with some embodiments.

FIG. 1 is a block diagram depicting an example computing environment 100 that includes a widget browser module 102. The example computing environment 100 includes an application 104 that executes within the computing environment and causes the display on a display device 106 of an application window 108 that functions as a user interface. Through the activation of an item associated with the application window 108, such as a button widget 109, the application program is configured to send a request to the widget browser module 102 to cause the widget browser module 102 to cause the display of contextually relevant data in a widget window 110 that is displayed over a portion, but not all, of the application window 108. The contextually relevant data is related to content displayed within the application window 108 when the button widget 109 was activated. For example, if the application window 108 is displaying details of a Case entity, the contextually relevant data displayed in the widget window 110 may only include Macros and Folders containing Macros that are relevant to Case entities. When the main application displays a different entity such as an Account, then the contextually relevant data displayed in the widget window 110 may only include lists of Macros and Folders containing Macros relevant to Accounts.

The example widget browser module 102 is implemented within the computing environment 100 and comprises one or more a processors configured by programming instructions encoded in non-transient computer readable media. The widget browser module 102 and application 104 may be resident and executing on a user's computing device. Alternatively, the widget browser module 102 and application 104 may be resident and executing on a remote server and accessible to a user's computing device over a network, for example, via a webpage and a web browser.

The contextually relevant data includes data item descriptors, such as folder names, directory names, and file names. The data item descriptors may have a hierarchical arrangement such as that found in a hierarchical folder or directory arrangement. Every data item descriptor, except the root data item descriptor, lies beneath another data item descriptor in the hierarchy. The data item descriptor that is beneath a selected data item descriptor is referred to as a child data item descriptor of the selected data item descriptor, which is called the parent data item descriptor to the child data item descriptor. Data item descriptors in the same hierarchical level are referred to herein as sibling data item descriptors. The content of a selected data item descriptor, as used herein, includes a listing of all child data item descriptors to the selected data item descriptor, which are in the next lower hierarchical level within the hierarchy.

The example widget browser module 102 is configured to receive, from an executing application 104 on a computing device that is causing the display of an application window 108 on a display device 106, a request for display of a widget browser window 110. The request for display of a widget browser window may be initiated by activating a widget button 110, for example, in a utility bar of the application window 108 or initiated by activating a widget link 109 embedded on a web page.

The example widget browser module 102 is configured to generate, responsive to receipt of the request, the widget browser window 110 for display over a portion, but not all, of the application window 108. As an example, the widget browser window 110 may be displayed as a 640 by 800 pixel window over the application window 108. The widget browser window 110 includes a two-panel main display window 112 and a status bar display window 114 positioned underneath the two-panel main display window 112. The two-panel main display window 112 includes a first panel 116 and a second panel 118

The example widget browser module 102 is configured to cause to display, responsive to receipt of the request, a plurality of sibling data item descriptors in the first panel 116 of the two-panel main display window 110 that are contextually relevant to content in the application window 108 of the executing application 104. The example widget browser module is configured to display in the second panel 118, responsive to receipt of the request, a visual indication that there is nothing to preview until a data item descriptor is selected. In other examples, the widget browser module may be configured to not display anything in the second panel 118, responsive to receipt of the request, until a data item descriptor is selected.

Figure 2:
FIG. 2 is a diagram depicting an example screenshot of a display device that illustrates features provided by an example widget browser module, in accordance with some embodiments.

Depicted in FIG. 2 is an example screenshot of a display device that illustrates features provided by an example widget browser module. In this example, an application window 200 displays three window panels 202, 204, 206, wherein window panel 204 is active. Because a button widget 209 has been selected, a widget window 210 is displayed over the application window 200. The widget window 210 includes a first panel 212, a second panel 214, and a status bar display window 216. The status bar display window 216 includes a breadcrumb navigational tool 218, labelled "ALL" in this example screenshot. The first panel 212 includes data item descriptors 220 (e.g., folder names) that are contextually relevant to content in the active window panel 204. The second panel 214 includes a graphic that provides a visual indication that there is nothing to preview until a data item descriptor is selected.

Referring back to FIG. 1, the example widget browser module 102 is configured to cause to display, after selection of a data item descriptor in the first panel 116, the selected data item descriptor and sibling data item descriptors in the same hierarchical level in the first panel 116, and child data item descriptors of the selected data item descriptor that are in the next lower hierarchical level in the second panel 118.

Figure 3:
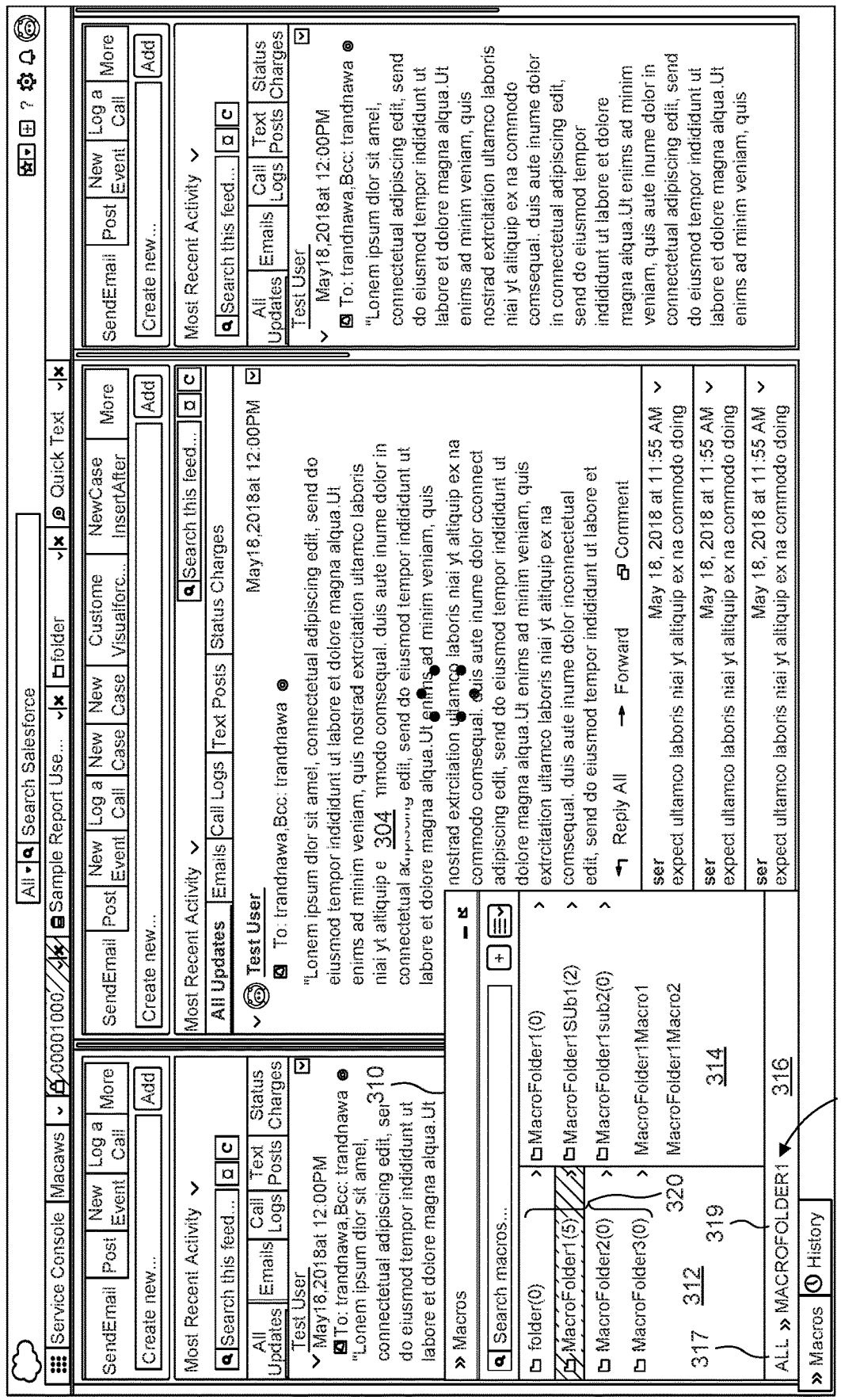
FIG. 3 is a diagram depicting another example screenshot of a display device that illustrates features provided by an example widget browser module, in accordance with some embodiments.

Depicted in FIG. 3 is another example screenshot of a display device that illustrates features provided by an example widget browser module. In this example, a widget window 310 includes a first panel 312, a second panel 314, and a status bar display window 316. The status bar display window 316 includes a breadcrumb navigational tool 318. The first panel 312 includes data item descriptors 320 (e.g., folder names) that are contextually relevant to content in an active window panel 304 in the application window 300. In particular, shown in this example are a selected data item descriptor entitled Macrofolder1 and sibling data item descriptors entitled folder, Macrofolder2, and Macrofolder3. The second panel 214 includes data item descriptors 322 that are child data item descriptors to the selected data item descriptor Macrofolder1. The breadcrumb navigational tool 318 includes breadcrumbs 317, 319 labelled "ALL" 317 and "MACROFOLDER1" 319, which, respectively, provide clickable links to a higher level data item descriptor ALL and the selected data item descriptor Macrofolder1.

Referring back to FIG. 1, the example widget browser module 102 is configured to cause to display, after selection of a data item descriptor in the second panel 118, the selected data item descriptor and sibling data item descriptors to the selected data item descriptor in the first panel 116 (e.g., the list in the right panel 118 shifts to the left panel 116), and, in the second panel 118, child data item descriptors of the selected data item descriptor that are in the next lower hierarchical level.

Figure 4:
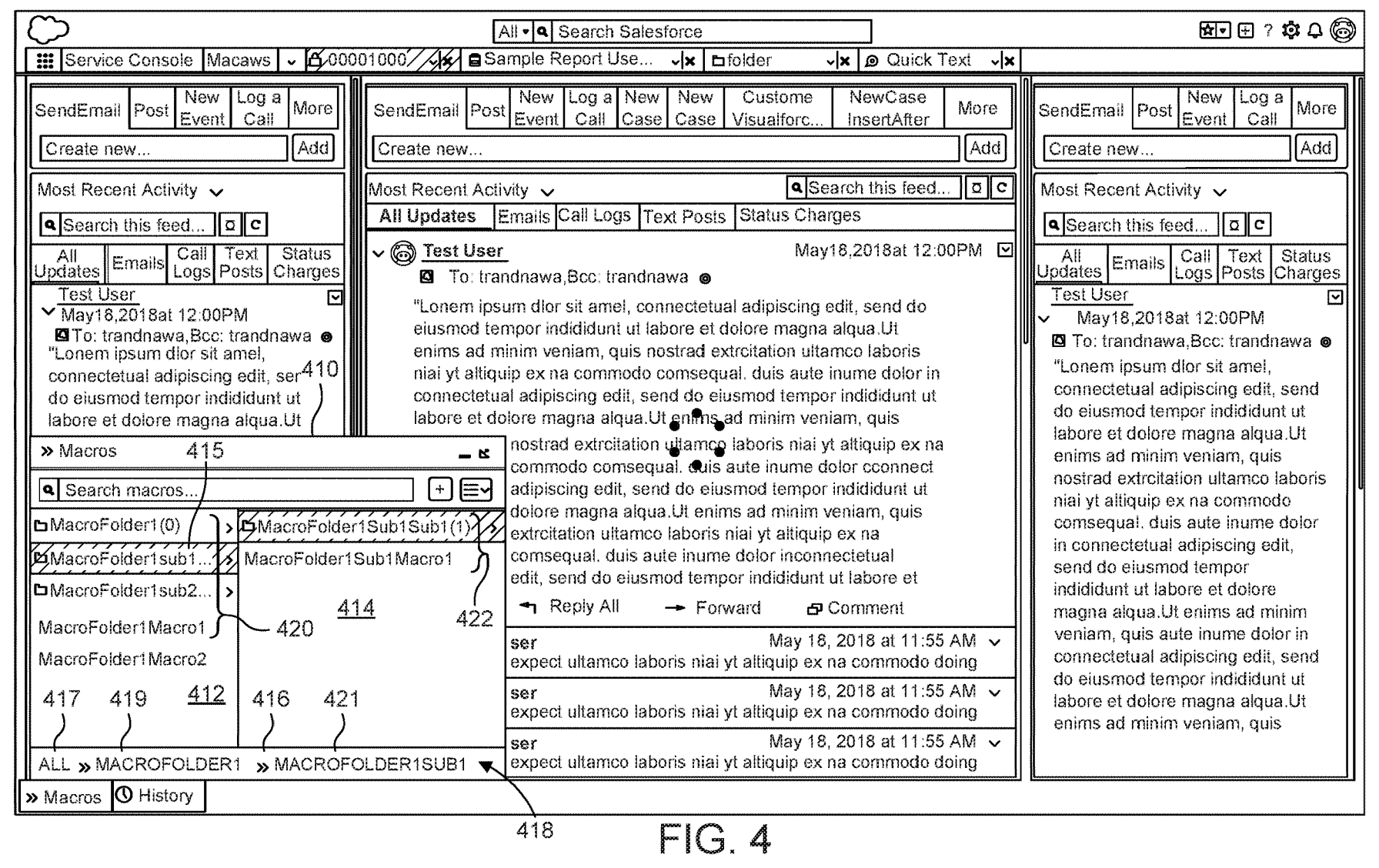

Depicted in FIG. 4 is another example screenshot of a display device that illustrates features provided by an example widget browser module. In this example, a widget window 410 includes a first panel 412, a second panel 414, and a status bar display window 416. The status bar display window 416 includes a breadcrumb navigational tool 418. The first panel 412 includes data item descriptors 420. In particular, shown in this example are a selected data item descriptor entitled Macrofolder1Sub1 415 and sibling data item descriptors. The second panel 414 includes data item descriptors 422 that are child data item descriptors to the selected data item descriptor Macrofolder1Sub1 415. The breadcrumb navigational tool 418 includes breadcrumbs 417, 419, 421 labelled "ALL" 417, "MACROFOLDER1" 419, and "MACROFOLDER1SUB1" 421, which, respectively, provide clickable links to a higher level (grandparent) data item descriptor ALL, a parent data item descriptor Macrofolder1, and the selected data item descriptor Macrofolder1Sub1 415.

Referring back to FIG. 1, the example widget browser module 102 is configured to cause the display, in the status bar display window 114, of a breadcrumb navigational tool containing breadcrumbs 120 (e.g., clickable links) configured to display the selected data item descriptor and each successive parent data item descriptor in higher hierarchical levels to a top-level parent data item descriptor. The breadcrumb navigational tool is further configured to allow selection (e.g., via a clickable link) of one of the data item descriptors displayed (via breadcrumbs) in the status bar display window 114.

As illustrated in FIG. 4, the example breadcrumb navigational tool 418 includes breadcrumbs 417, 419, 421 labelled "ALL" 417, "MACROFOLDER1" 419, and "MACROFOLDER1SUB1" 421, which, respectively, provide clickable links to a higher level (grandparent) data item descriptor ALL, a parent data item descriptor Macrofolder1, and the selected data item descriptor Macrofolder1Sub1 415. The example breadcrumb navigational tool 418 provides, via breadcrumbs 417, 419, 421, a list of links marking the traversed path in the course of navigation through the folders. Clicking on one of the breadcrumbs will cause the data item descriptor associated with the selected breadcrumb along with sibling data item descriptors to display in the first panel and child data item descriptors to display in the second panel.

Referring back to FIG. 1, the example widget browser module 102 is configured to update the data item descriptors displayed by the breadcrumb navigational tool via the breadcrumbs 120 in the status bar display window 114 to reflect the selection of another data item descriptor. The example widget browser module 102 is configured to cause the display, after selection of a data item descriptor via the breadcrumb navigational tool, of the selected data item descriptor and sibling data item descriptors to the selected data item descriptor in the first panel 116, and, in the second panel 118, child data item descriptors of the selected data item descriptor that are in the next lower hierarchical level.

The example widget browser module 102 is also configured to reselect a previously selected data item descriptor as the selected data item descriptor responsive to the actuation of a forward or back arrow key on a user keyboard. Additionally, the example widget browser module 102 is configured to not display data item descriptors in the second panel when the selected data item descriptor has no child data item descriptors.

The example widget browser module 102 includes an engine module 122 and a graphical user interface (GUI) module 124. The example engine module 122 is configured to interact with the application 104 to receive the request for widget window generation, retrieve data item descriptions or the location of data item descriptions to be displayed in the widget window 110, navigate through the data item description hierarchy to select content to be displayed in the first panel 116, second panel 118, and status bar panel 114, and control the GUI module 124 to generate the display of content in the first panel 116, second panel 118, and status bar panel 114. The example GUI module 124 is configured to cause the display of content in the first panel 116, second panel 118, and status panel 114, retrieve user selection of data item descriptors, and communicate the user selections to the engine module 122.

Figure 5:
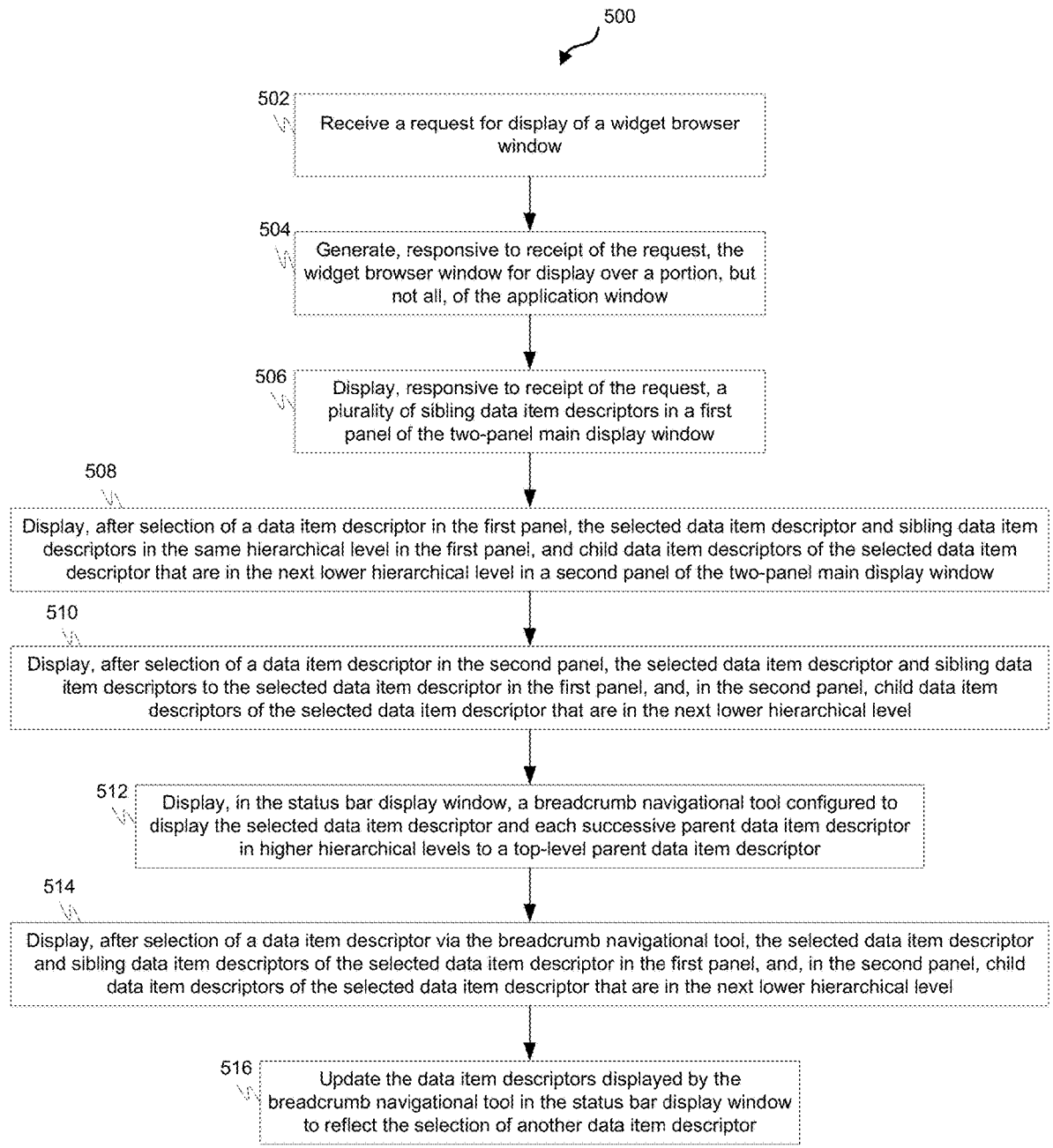
FIG. 5 is a process flow chart depicting an example process in an example widget browser module.

FIG. 5 is a process flow chart depicting an example process 500 in an example widget browser module. The order of operation within the example process 500 is not limited to the sequential execution as illustrated in the figure, but may be performed in one or more varying orders as applicable and in accordance with the present disclosure.

The example process includes receiving a request for display of a widget browser window (operation 502). The request may be received from an executing application on a computing device that is causing the display of an application window on a display device.

The example process includes generating, responsive to receipt of the request, the widget browser window for display over a portion, but not all, of the application window (operation 504). The widget browser window includes a two-panel main display window and a status bar display window positioned underneath the two-panel main display window.

The example process includes displaying, responsive to receipt of the request, a plurality of sibling data item descriptors in a first panel of the two-panel main display window (operation 506). The sibling data item descriptors are contextually relevant to content in the application window of the executing application.

The example process includes displaying, after selection of a data item descriptor in the first panel, the selected data item descriptor and sibling data item descriptors in the same hierarchical level in the first panel, and child data item descriptors of the selected data item descriptor that are in the next lower hierarchical level in a second panel of the two-panel main display window (operation 508).

The example process includes displaying, after selection of a data item descriptor in the second panel, the selected data item descriptor and sibling data item descriptors to the selected data item descriptor in the first panel, and, in the second panel, child data item descriptors of the selected data item descriptor that are in the next lower hierarchical level (operation 510). In essence, contents from the former second panel are shifted to the first panel and new content (child data item descriptors) is provided in the second panel.

The example process includes displaying, in the status bar display window, a breadcrumb navigational tool configured to display the selected data item descriptor and each successive parent data item descriptor in higher hierarchical levels to a top-level parent data item descriptor (operation 512). The breadcrumb navigational tool is further configured to allow the selection of one of the data item descriptors displayed in the status bar display window.

The example process includes displaying, after selection of a data item descriptor via the breadcrumb navigational tool, the selected data item descriptor and sibling data item descriptors of the selected data item descriptor in the first panel, and, in the second panel, child data item descriptors of the selected data item descriptor that are in the next lower hierarchical level (operation 514).

The example process includes updating the data item descriptors displayed by the breadcrumb navigational tool in the status bar display window to reflect the selection of another data item descriptor (operation 516).

Figure 6:
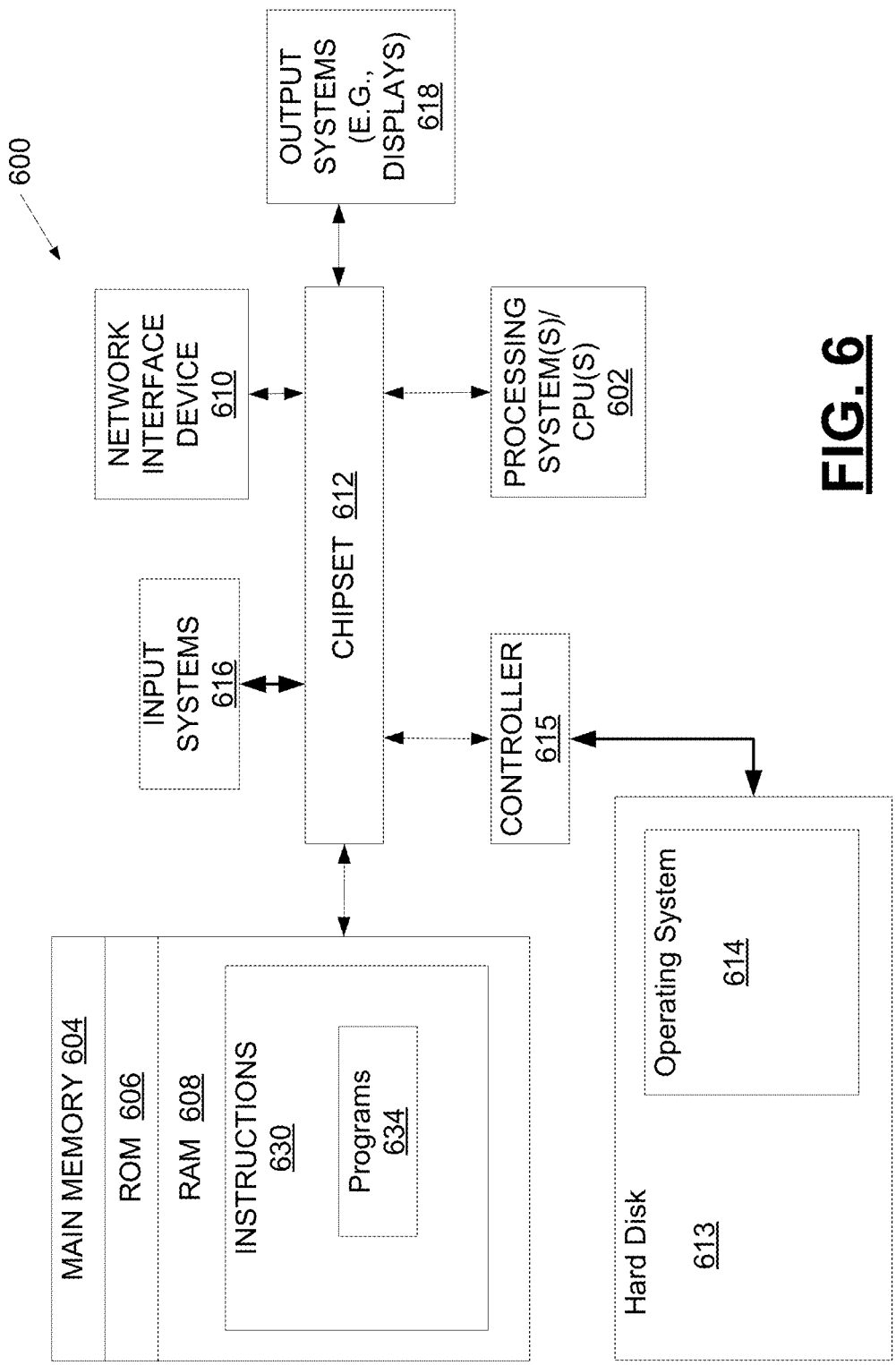
FIG. 6 is a schematic block diagram of an example computer system that can be used to implement the techniques and methods described herein, in accordance with some embodiments.

FIG. 6 is a schematic block diagram of an example computer system that can be used to implement the techniques and methods described herein. The example computer system can include one or more processing system(s) 602, main memory 604, a network interface device (NID) 610, a chipset 612, a hard disk 613 and hard disk controller 615, input systems 616, and output systems 618.

The chipset 612 is usually located on a motherboard and is a set of electronic components (e.g., in an integrated circuit) that interconnects and manages the data flow between the processing system(s) 602 and other elements of the computer system and connected peripherals. For instance, the chipset 612 provides an interface between the processing system(s) 602 and the main memory 604, and also includes functionality for providing network connectivity through the NID 610, such as a gigabit Ethernet adapter. The chipset 612 typically contains the processor bus interface (also known as a front-side bus), memory controllers, bus controllers, I/O controllers, etc.

Processing system(s) 602 represents one or more general-purpose processing devices such as a microprocessor, central processing unit, or the like. More particularly, the processing system(s) 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing system(s) 602 may also be one or more special-purpose processing devices such as an application specific integrated circuit (ASIC), a field programmable gate array (FPGA), a digital signal processor (DSP), network processor, or the like.

The processing system(s) 602 can include one or more central processing units (CPUs) that operate in conjunction with the chipset 612. The processing system(s) 602 perform arithmetic and logical operations necessary for the operation of the example computer system.

The NID 610 is capable of connecting the example computer system to other computers over a network. The network can be an Ethernet or Gigabyte Ethernet LAN, a fiber ring, a fiber star, wireless, optical, satellite, a WAN, a MAN, or any other network technology, topology, protocol, or combination thereof.

Input system(s) 616 (or input device(s)) allow a user to input information to the computer system and can include things such as a keyboard, a mouse or other cursor pointing device, a pen, a voice input device, a touch input device, a webcam device, a microphone, etc. Output system(s) 618 (or output device(s)) present information to the user of the computer system and can include things such as a display, monitor, speakers, or the like.

The chipset 612 can provide an interface to various forms of computer-readable storage media including a main memory 604 (e.g., read-only memory (ROM), flash memory, dynamic random access memory (DRAM) such as synchronous DRAM (SDRAM)), and hard disk 613. The processing system(s) 602 can communicate with the various forms of computer-readable storage media via the chipset 612 and appropriate buses.

A hard disk 613 is a form of non-volatile memory that can store an operating system (OS) 614. The operating system 614 is software that is copied into RAM and executed by the processing system(s) 602 to control the operation of the example computer system, manage computer hardware and software resources, and provide common services for computer programs executed by the processing system(s) 602. Regardless of the implementation, the operating system 614 includes many different "components" that make the different parts of the example computer system work together. The disk controller 615 is the controller circuit which enables the processing system 602 to communicate with a hard disk 613, and provides an interface between the hard disk 613 and the bus connecting it to the rest of the system.

The main memory 604 may be composed of many different types of memory components. The main memory 604 can include non-volatile memory (such as read-only memory (ROM) 606, flash memory, etc.), volatile memory (such as random access memory (RAM) 608), or some combination of the two. The RAM 608 can be any type of suitable random access memory including the various types of dynamic random access memory (DRAM) such as SDRAM, the various types of static RAM (SRAM). The main memory 604 (as well as the processing system(s) 602) may be distributed throughout the example computer system.

The ROM 606 of the main memory 604 can be used to store firmware that includes program code containing the basic routines that help to start up the example computer system and to transfer information between elements within the example computer system. The ROM of the main memory 604 may also store other software components necessary for the operation of the example computer system.

The RAM 608 stores programs/instructions 630 or executable code for one or more programs 634 that can be loaded and executed at processing system(s) 602 to perform various functions. The programs/instructions 630 are computer readable program code that can be stored in RAM 608 (or other a non-transitory computer readable medium of the example computer system) that can be read and executed by processing system(s) 602 to perform various acts, tasks, functions, and steps as described herein. The methods and techniques described herein can be captured in programming instructions 630 for execution by the processing system 602 to cause the example computer system to perform the described methods, processes, and techniques.

The subject matter described herein discloses apparatus, systems, techniques and articles for an intuitive and efficient way for allowing a user to navigate through folders within a small or widget sized (e.g., 600×480) browser panel (e.g., Macro and QuickText panel).

In one embodiment, a widget browser module configured to display contextually relevant data item descriptors arranged according to a hierarchical tree structure is provided. The data items comprise file directories, file folders or file names. The widget browser module comprises a processor configured by programming instructions encoded in non-transient computer readable media. The widget browser module is configured to: receive, from an executing application on a computing device that is causing the display of an application window on a display device, a request for display of a widget browser window; generate, responsive to receipt of the request, the widget browser window for display over a portion, but not all, of the application window, the widget browser window including a two-panel main display window and a status bar display window positioned underneath the two-panel main display window; display, responsive to receipt of the request, a plurality of sibling, data item descriptors in a first panel of the two-panel main display window that are contextually relevant to content in the application window of the executing application; display, after selection of a data item descriptor in the first panel, the selected data item descriptor and sibling data item descriptors in the same hierarchical level in the first panel, and child data item descriptors of the selected data item descriptor that are in the next lower hierarchical level in a second panel of the two-panel main display window; display, after selection of a data item descriptor in the second panel, the selected data item descriptor and sibling data item descriptors to the selected data item descriptor in the first panel, and, in the second panel, child data item descriptors of the selected data item descriptor that are in the next lower hierarchical level; display, in the status bar display window, a breadcrumb navigational tool configured to display the selected data item descriptor and each successive parent data item descriptor in higher hierarchical levels to a top-level parent data item descriptor, the breadcrumb navigational tool further configured to allow selection of one of the data item descriptors displayed in the status bar display window; and update the data item descriptors displayed by the breadcrumb navigational tool in the status bar display window to reflect the selection of another data item descriptor.

These aspects and other embodiments may include one or more of the following features. The widget browser module may be further configured to display, after selection of a data item descriptor via the breadcrumb navigational tool, the selected data item descriptor and sibling data item descriptors to the selected data item descriptor in the first panel, and, in the second panel, child data item descriptors of the selected data item descriptor that are in the next lower hierarchical level. The widget browser module may be further configured to reselect a previously selected data item descriptor as the selected data item descriptor responsive to the actuation of a forward or back arrow key on a user keyboard. The widget browser module may be further configured to display in the second panel, responsive to receipt of the request, a visual indication that there is nothing to preview until a data item descriptor is selected. The widget browser module may be further configured to not display data item descriptors in the second panel when the selected data item descriptor has no child data item descriptors. The request for display of a widget browser window may be initiated by activating a widget link embedded on a web page. The request for display of a widget browser window may be initiated by activating a widget button in a utility bar of the application window.

In another embodiment, a widget browser module configured to display contextually relevant data item descriptors arranged according to a hierarchical tree structure is disclosed. The widget browser module comprises a processor configured by programming instructions encoded in non-transient computer readable media. The widget browser module is configured to: receive, from an executing application on a computing device that is causing the display of an application window on a display device, a request for display of a widget browser window; generate, responsive to receipt of the request, the widget browser window for display over a portion, but not all, of the application window, the widget browser window including a two-panel main display window and a status bar display window positioned underneath the two-panel main display window; display, responsive to receipt of the request, a plurality of sibling data item descriptors in a first panel of the two-panel main display window that are contextually relevant to content in the application window of the executing application; display, after selection of a data item descriptor in the first panel, the selected data item descriptor and sibling data item descriptors in the same hierarchical level in the first panel, and child data item descriptors of the selected data item descriptor that are in the next lower hierarchical level in a second panel of the two-panel main display window; display, in the status bar display window, a breadcrumb navigational tool configured to display the selected data item descriptor and each successive parent data item descriptor in higher hierarchical levels to the top-level parent data item descriptor, the breadcrumb navigational tool further configured to allow selection of one of the data item descriptors displayed in the status bar display window; display, after selection of a data item descriptor via the breadcrumb navigational tool, the selected data item descriptor and sibling data item descriptors to the selected data item descriptor in the first panel, and, in the second panel, child data item descriptors of the selected data item descriptor that are in the next lower hierarchical level; and update the data item descriptors displayed by the breadcrumb navigational tool in the status bar display window to reflect the selection of another data item descriptor.

These aspects and other embodiments may include one or more of the following features. The widget browser module may be further configured to reselect a previously selected data item descriptor as the selected data item descriptor responsive to the actuation of a forward or back arrow key on a user keyboard. The widget browser module may be further configured to display in the second panel, responsive to receipt of the request, a visual indication that there is nothing to preview until a data item descriptor is selected. The widget browser module may be further configured to not display data item descriptors in the second panel when the selected data item descriptor has no child data item descriptors. The request for display of a widget browser window may be initiated by activating a widget link embedded on a web page. The request for display of a widget browser window may be initiated by activating a widget button in a utility bar of the application window.

In another embodiment, a method of displaying a widget browser is provided The method comprises: receiving, from an executing application on a computing device that is causing the display of an application window on a display device, a request for display of a widget browser window; generating, responsive to receipt of the request, the widget browser window for display over a portion, but not all, of the application window, the widget browser window including a two-panel main display window and a status bar display window positioned underneath the two-panel main display window; displaying, responsive to receipt of the request, a plurality of sibling data item descriptors in a first panel of the two-panel main display window that are contextually relevant to content in the application window of the executing application; displaying, after selection of a data item descriptor in the first panel, the selected data item descriptor and sibling data item descriptors in the same hierarchical level in the first panel, and child data item descriptors of the selected data item descriptor that are in the next lower hierarchical level in a second panel of the two-panel main display window; displaying, after selection of a data item descriptor in the second panel, the selected data item descriptor and sibling data item descriptors to the selected data item descriptor in the first panel, and, in the second panel, child data item descriptors of the selected data item descriptor that are in the next lower hierarchical level; displaying, in the status bar display window, a breadcrumb navigational tool configured to display the selected data item descriptor and each successive parent data item descriptor in higher hierarchical levels to a top-level parent data item descriptor, the breadcrumb navigational tool further configured to allow selection of one of the data item descriptors displayed in the status bar display window; and updating the data item descriptors displayed by the breadcrumb navigational tool in the status bar display window to reflect the selection of another data item descriptor.

These aspects and other embodiments may include one or more of the following features. The method may further comprise displaying, after selection of a data item descriptor via the breadcrumb navigational tool, the selected data item descriptor and sibling data item descriptors to the selected data item descriptor in the first panel, and, in the second panel, child data item descriptors of the selected data item descriptor that are in the next lower hierarchical level. The method may further comprise reselecting a previously selected data item descriptor as the selected data item descriptor responsive to the actuation of a forward or back arrow key on a user keyboard. The method may further comprise displaying in the second panel, responsive to receipt of the request, a visual indication that there is nothing to preview until a data item descriptor is selected. The method may further comprise not displaying data item descriptors in the second panel when the selected data item descriptor has no child data item descriptors. The method may further comprise initiating the request for display of a widget browser window by activating a widget link embedded on a web page. The method may further comprise initiating the request for display of a widget browser window by activating a widget button in a utility bar of the application window.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" or "example" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A widget browser module configured to display contextually relevant data item descriptors arranged according to a hierarchical tree structure, the data items comprising file directories, file folders or file names, the widget browser module comprising a processor configured by programming instructions encoded in non-transitory computer readable media, the widget browser module configured to:

receive, from an executing application on a computing device that is causing the display of an application window on a display device, a request for display of contextually relevant data in a widget browser window that is displayed over a portion, but not all, of the application window;

generate, responsive to receipt of the request, the widget browser window for overlaying a portion, but not all, of the application window, the widget browser window being enclosed in a second container window that overlays a portion of a first window panel enclosed in the application window, the widget browser window including a user interface control for minimizing the display of the second container window without affecting the size of the application window, a two-panel main display comprising a first panel for displaying data item descriptors positioned beside and not above a second panel for displaying data item descriptors, and a breadcrumb navigational tool in a status bar display positioned underneath both the first panel and the second panel;

display, responsive to receipt of the request, a plurality of sibling data item descriptors in the first panel containing only file directories, file folders, or file names that are contextually relevant to the case or account that is displayed in the application window of the executing application without displaying data item descriptors in the second panel;

display, after selection of a data item descriptor in the first panel, the selected data item descriptor and sibling data item descriptors in the same hierarchical level in the first panel, and child data item descriptors of the selected data item descriptor that are in the next lower hierarchical level in the second panel;

display, after selection of a data item descriptor in the second panel, the selected data item descriptor and sibling data item descriptors to the selected data item descriptor in the first panel, and, in the second panel, child data item descriptors of the selected data item descriptor that are in the next lower hierarchical level;

display, in the status bar display, the breadcrumb navigational tool which is configured to display the selected data item descriptor and each successive parent data item descriptor in higher hierarchical levels to a top-level parent data item descriptor, the breadcrumb navigational tool further configured to allow selection of one of the data item descriptors displayed in the status bar display;

reselect, after actuation of a forward or back arrow key on a user keyboard, a previously selected data item descriptor as the selected data item descriptor;

display the reselected data item descriptor along with sibling data item descriptors of the reselected data item descriptor in the first panel;

display the child data item descriptor of the reselected data item descriptor along with sibling data item descriptors of the child data item descriptor of the reselected data item descriptor in the second panel; and update the data item descriptors displayed by the breadcrumb navigational tool in the status bar display to reflect the selection of another data item descriptor.

2. The widget browser module of claim 1, further configured to display, after selection of a data item descriptor via the breadcrumb navigational tool, the selected data item descriptor and sibling data item descriptors to the selected data item descriptor in the first panel, and, in the second panel, child data item descriptors of the selected data item descriptor that are in the next lower hierarchical level.

3. The widget browser module of claim 1, further configured to display in the second panel, responsive to receipt of the request, a textual indication that there is nothing to preview until a data item descriptor is selected.

4. The widget browser module of claim 1, further configured to not display data item descriptors in the second panel when the selected data item descriptor has no child data item descriptors.

5. The widget browser module of claim 1, wherein the request for display of a widget browser window is initiated by activating a widget link embedded on a web page.

6. The widget browser module of claim 1, wherein the request for display of a widget browser window is initiated by activating a widget button in a utility bar of the application window.

7. A widget browser module configured to display contextually relevant data item descriptors arranged according to a hierarchical tree structure, the widget browser module comprising a processor configured by programming instructions encoded in non-transitory computer readable media, the widget browser module configured to:

receive, from an executing application on a computing device that is causing the display of an application window on a display device, a request for display of a widget browser window;

generate, responsive to receipt of the request, the widget browser window for overlaying a portion, but not all, of the application window, the widget browser window being enclosed in a second container window that overlays a portion of a first window panel enclosed in the application window, the widget browser window including: a user interface control for minimizing the display of the second container window without affecting the size of the application window, a two-panel main display comprising a first panel for displaying data item descriptors positioned beside and not above a second panel for displaying data item descriptors, and a breadcrumb navigational tool in a status bar display positioned underneath both the first panel and the second panel;

display, responsive to receipt of the request, a plurality of sibling data item descriptors in the first panel containing only file directories, file folders, or file names that are contextually relevant to the case or account that is displayed in the application window of the executing application without displaying data item descriptors in the second panel;

display, after selection of a data item descriptor in the first panel, the selected data item descriptor and sibling data item descriptors in the same hierarchical level in the first panel, and child data item descriptors of the selected data item descriptor that are in the next lower hierarchical level in the second panel;

display, in the status bar display, the breadcrumb navigational tool which is configured to display the selected data item descriptor and each successive parent data item descriptor in higher hierarchical levels to the top-level parent data item descriptor, the breadcrumb navigational tool further configured to allow selection of one of the data item descriptors displayed in the status bar display;

display, after selection of a data item descriptor via the breadcrumb navigational tool, the selected data item descriptor and sibling data item descriptors to the selected data item descriptor in the first panel, and, in the second panel, child data item descriptors of the selected data item descriptor that are in the next lower hierarchical level;

reselect, after actuation of a forward or back arrow key on a user keyboard, a previously selected data item descriptor as the selected data item descriptor;

display the reselected data item descriptor along with sibling data item descriptors of the reselected data item descriptor in the first panel;

display the child data item descriptor of the reselected data item descriptor along with sibling data item descriptors of the child data item descriptor of the reselected data item descriptor in the second panel; and update the data item descriptors displayed by the breadcrumb navigational tool in the status bar display to reflect the selection of another data item descriptor.

8. The widget browser module of claim 7, further configured to display in the second panel, responsive to receipt of the request, a textual indication that there is nothing to preview until a data item descriptor is selected.

9. The widget browser module of claim 7, further configured to not display data item descriptors in the second panel when the selected data item descriptor has no child data item descriptors.

10. The widget browser module of claim 7, wherein the request for display of a widget browser window is initiated by activating a widget link embedded on a web page.

11. The widget browser module of claim 7, wherein the request for display of a widget browser window is initiated by activating a widget button in a utility bar of the application window.

12. A method of displaying a widget browser comprising:

receiving, from an executing application on a computing device that is causing the display of an application window on a display device, a request for display of a widget browser window;

generating, responsive to receipt of the request, the widget browser window for overlaying a portion, but not all, of the application window, the widget browser window being enclosed in a second container window that overlays a portion of a first window panel enclosed in the application window, the widget browser window including: a user interface control for minimizing the display of the second container window without affecting the size of the application window, a two-panel main display comprising a first panel for displaying data item descriptors positioned beside and not above a second panel for displaying data item descriptors, and a breadcrumb navigational tool in a status bar display positioned underneath both the first panel and the second panel;

displaying, responsive to receipt of the request, a plurality of sibling data item descriptors in the first panel containing only file directories, file folders, or file names that are contextually relevant to the case or account that is displayed in the application window of the executing application without displaying data item descriptors in the second panel;

displaying, after selection of a data item descriptor in the first panel, the selected data item descriptor and sibling data item descriptors in the same hierarchical level in the first panel, and child data item descriptors of the selected data item descriptor that are in the next lower hierarchical level in the second panel;

displaying, after selection of a data item descriptor in the second panel, the selected data item descriptor and sibling data item descriptors to the selected data item descriptor in the first panel, and, in the second panel, child data item descriptors of the selected data item descriptor that are in the next lower hierarchical level;

displaying, in the status bar display, the breadcrumb navigational tool which is configured to display the selected data item descriptor and each successive parent data item descriptor in higher hierarchical levels to a top-level parent data item descriptor, the breadcrumb navigational tool further configured to allow selection of one of the data item descriptors displayed in the status bar display;

reselecting, after actuation of a forward or back arrow key on a user keyboard, a previously selected data item descriptor as the selected data item descriptor;

displaying the reselected data item descriptor along with sibling data item descriptors of the reselected data item descriptor in the first panel;

displaying the child data item descriptor of the reselected data item descriptor along with sibling data item descriptors of the child data item descriptor of the reselected data item descriptor in the second panel; and updating the data item descriptors displayed by the breadcrumb navigational tool in the status bar display to reflect the selection of another data item descriptor.

13. The method of claim 12, further comprising displaying, after selection of a data item descriptor via the breadcrumb navigational tool, the selected data item descriptor and sibling data item descriptors to the selected data item descriptor in the first panel, and, in the second panel, child data item descriptors of the selected data item descriptor that are in the next lower hierarchical level.

14. The method of claim 12, further comprising displaying in the second panel, responsive to receipt of the request, a textual indication that there is nothing to preview until a data item descriptor is selected.

15. The method of claim 12, further comprising not displaying data item descriptors in the second panel when the selected data item descriptor has no child data item descriptors.

16. The method of claim 12, further comprising initiating the request for display of a widget browser window by activating a widget link embedded on a web page.

17. The method of claim 12, further comprising initiating the request for display of a widget browser window by activating a widget button in a utility bar of the application window.

* * * * *